(12) United States Patent
Shemer et al.

(10) Patent No.: US 12,111,841 B2
(45) Date of Patent: Oct. 8, 2024

(54) AUTOMATIC CONSISTENCY GROUP SCALE-OUT FOR ANY POINT IN TIME REPLICATION SYSTEMS

(71) Applicant: EMC IP Holding Company LLC, Hopkinton, MA (US)

(72) Inventors: Jehuda Shemer, Kfar Saba (IL); Erez Sharvit, Ramat Gan (IL); Valerie Lotosh, Ramat Gan (IL)

(73) Assignee: EMC IP Holding Company LLC, Hopkinton, MA (US)

(*) Notice: Subject to any disclaimer, the term of this patent is extended or adjusted under 35 U.S.C. 154(b) by 91 days.

(21) Appl. No.: 17/235,391

(22) Filed: Apr. 20, 2021

(65) Prior Publication Data
US 2022/0335059 A1    Oct. 20, 2022

(51) Int. Cl.
*G06F 16/27* (2019.01)

(52) U.S. Cl.
CPC ............ *G06F 16/27* (2019.01); *G06F 16/273* (2019.01); *G06F 16/275* (2019.01); *G06F 16/278* (2019.01)

(58) Field of Classification Search
CPC ...... G06F 16/27; G06F 16/273; G06F 16/275; G06F 16/278
See application file for complete search history.

(56) References Cited

U.S. PATENT DOCUMENTS

| | | | |
|---|---|---|---|
| 8,966,382 B1* | 2/2015 | Yehuda | G06F 3/0484 715/762 |
| 10,437,783 B1* | 10/2019 | Cohen | G06F 16/2365 |
| 2010/0250497 A1* | 9/2010 | Redlich | H04L 63/105 707/661 |
| 2014/0304412 A1* | 10/2014 | Prakash | H04L 69/40 709/226 |
| 2015/0126282 A1* | 5/2015 | Hitomi | A63F 13/355 463/42 |
| 2017/0149924 A1* | 5/2017 | Peterson | H04L 67/5682 |
| 2021/0089210 A1* | 3/2021 | Seguy | H04L 41/142 |
| 2021/0089238 A1* | 3/2021 | Muniswamy-Reddy | G06F 3/0637 |

* cited by examiner

*Primary Examiner* — Kris E Mackes
*Assistant Examiner* — Lin Lin M Htay
(74) *Attorney, Agent, or Firm* — Workman Nydegger

(57) ABSTRACT

One example method includes measuring a journal distribution lag of a journal, evaluating a first operational measure at a production site, and evaluating a second operational measure at a replication site operable to communicate with a production site, based on the journal distribution lag, and the evaluation of the first operational measure and the second operational measure, determining a scale out for a consistency group of the replication site, and implementing the scale out of the consistency group.

14 Claims, 7 Drawing Sheets

AUTOMATIC CONSISTENCY GROUP SCALE-OUT FOR ANY POINT IN TIME REPLICATION SYSTEMS

FIELD OF THE INVENTION

Embodiments of the present invention generally relate to data protection. More particularly, at least some embodiments of the invention relate to systems, hardware, software, computer-readable media, and methods for automatically scaling out a replica side consistency group to accommodate dynamic production side and replica side conditions and constraints.

BACKGROUND

Many data protection systems employ a replica site to which production IOs (Input/Output operations) are replicated so that, in the event of a problem on the production side, the replica IOs at the production site can be used to restore production data to a particular point in time. The replica site may be referred to as including a consistency group, so-called because the replica site is able to maintain the replica data in a state that is consistent with the state of the production data. While replica sites and consistency groups have generally proven useful, various challenges still remain.

For example, typical IO load-balancing triggers do not work well on replication systems. Particularly, limitations on load balancing can be imposed by both production and replica clusters. Most load balancing schemes cannot take this into account.

As another example, typical measurements of replica side performance parameters are not good predictors for scale-out. Particularly, there are multiple entities in the IO path from the production site to the replica site in a replication system, and there is a time difference, which may be significant, between when measurements are taken at the production site, and when measurements are taken at the replica site. Further, using production site measurements such as IOPs (IO operations per second), data throughput (IOPs×average IO size), or simply 'throughput,' and latency, on the replica side may not yield the expected results. This complex combination of factors may make it difficult to understand, determine, and implement, the necessary scale of resources on the replication side.

Another problem with current approaches to replication concerns the fact that parallel access to virtual volumes may be limited by virtual infrastructure. Particularly, virtual infrastructure implementations do not allow, or severely constrain, parallel access from multiple compute entities. Thus, it may be difficult or impossible to scale out resources at a replica site.

A final example of problems occurring with regard to current replication approaches concerns the fact that adding additional volumes to journals is not a straightforward due to write order constraints and PiT (Point in Time) management. For example, simply adding volumes to an IO journal to provide parallelism does not work as the additional volumes break write order fidelity, and create data inconsistencies. Moreover, attempting to synchronize write order at the individual IO level is impractical.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
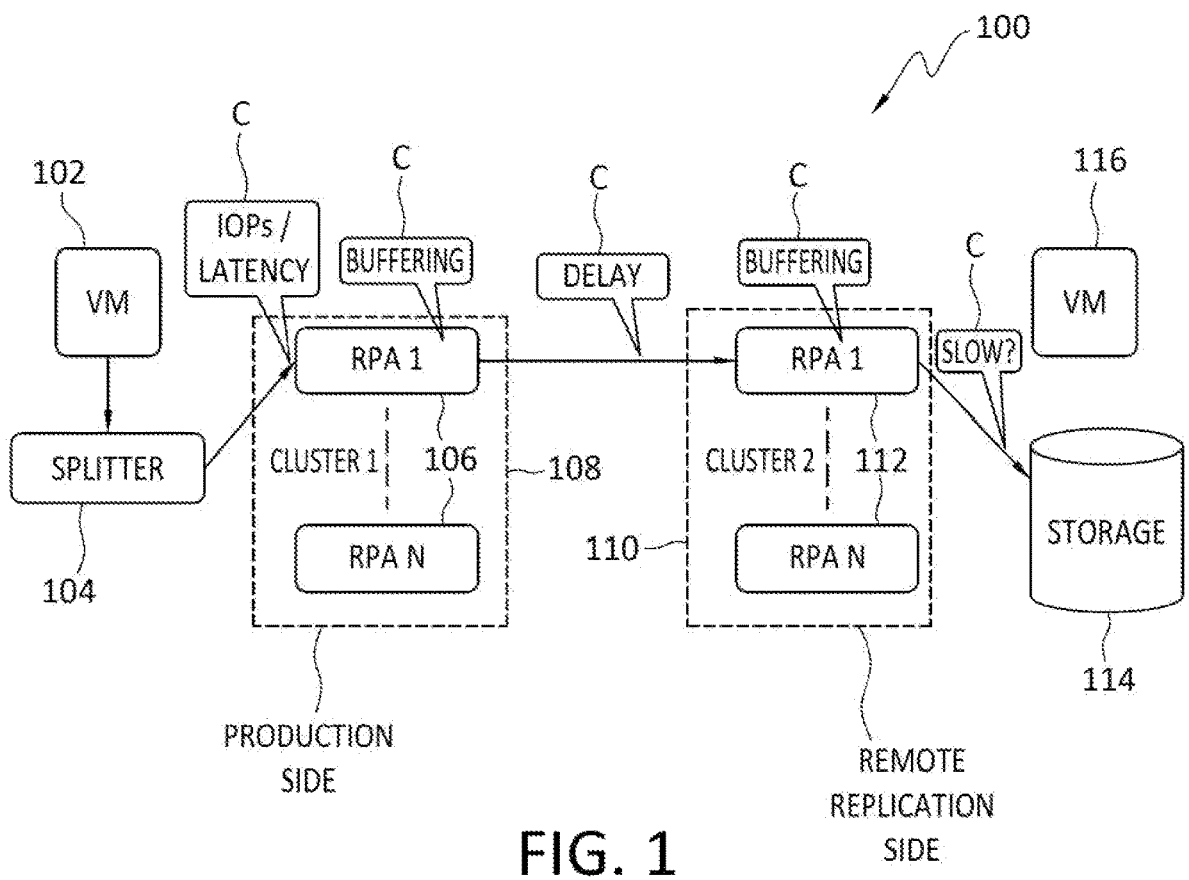
FIG. 1 discloses a hypothetical replication system configuration with various constraints.

Embodiments of the present invention generally relate to data protection. More particularly, at least some embodiments of the invention relate to systems, hardware, software, computer-readable media, and methods for automatically scaling out a replica side consistency group to accommodate dynamic production side and replica side conditions and constraints.

In general, example embodiments of the invention include a fully automated method to optimize scale-out of a single CG (Consistency Group) that takes into account both production and replica side performance constraints. While typical systems use latency or IO performance measures to control the scale of a CG, example embodiments may employ an unlikely measure, namely, the replica journal distribution lag, to properly and efficiently determine the correct scale for a given CG. Embodiments of the invention further embrace methods for achieving this scale with proper journal volume management. Thus, example embodiments may comprise two components. The first component may comprise determination of scale-out level using a combination of standard production measures and the aforementioned use of the replica journal distribution lag parameter, and the second component may comprise multi-volume journal usage with splitter and management layer changes to allow non-disruptive scale level changes while maintaining data consistency. Finally, example embodiments may employ address partitioning and journal barrier points for IO synchronization on the replica side.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that such embodiments may provide replication and PiT support for even the most demanding VMs and may do so without requiring any customer or vendor intervention. As another example, an embodiment may efficiently consider both production and replica side constraints to timely identify and implement a CG scaling decision, whether that decision is to scale up or scale down. An embodiment of the invention may provide for seamless, and non-disruptive, transition to a scale out process, including overcoming PiT journal access limitations imposed by a virtual infrastructure. Finally, an embodiment may automatically change a scale out factor to meet performance requirements of one or more VMs protected with the replication site CG. Various other features and advantages of some example embodiments are disclosed elsewhere herein.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which resources such as RPAs are scaled, that is, added/removed to/from a CG of a replication site. Because scaling decisions may be based in part upon, and affect, multiple streams of IOs received at a replication site from a production site, and because those streams may each include hundreds, thousands, tens of thousands, or more, IOs per second (IOPs), evaluating IOs and making scaling decisions are well beyond the mental capabilities of any human to perform practically, or otherwise. Moreover, scaling decisions may be made in real time, or near real time and may be made based on a wide range of variables whose respective values change often, and unpredictably. Thus, while simplistic examples may be disclosed herein, those are only for the purpose of illustration and to simplify the discussion. Accordingly, nothing herein should be construed as teaching or suggesting that any aspect of any embodiment of the invention could or would be performed, practically or otherwise, in the mind of a human.

A. General Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

Devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

A. OVERVIEW

In general, some example embodiments of the invention are directed to methods for automatically changing the scale-out factor in a replication system. The scale-out level refers to how many appliances, such as DellEMC Recover-Point Appliances (RPA) that manage replication setup and management, will handle each CG. Some conventional scale-out trigger mechanisms use IOPs, throughput, or IO latency, as measures for scale-out level. While this approach may work on most standard load-balanced systems, replication systems have multiple connected clusters deployed, and it turns out that the replica cluster may also be a bottleneck, requiring different scale-out characteristics on the replication side than the production side.

Due to memory and communication constraints, the amount of scale-out on the production side and replica side should correlate with each other, it may be almost meaningless to scale-out only the production side for example, even if the reason for implementing the scale-out may be due to conditions on only one side of the replication operations. That is, in order to achieve efficient and effective operations, both the production and replication sides may both have to be scaled out, even though only the replication side, for example, actually requires a scale out.

IO buffering and networking latencies introduce a time difference between the production side state, where the IOs are coming in, and the replica side state, where IOs are written to storage. Another complicating factor is that slow storage systems and networking at the replica side SAN may induce additional delays. The total time difference is usually seconds but can be a few minutes due to load or error handling. The effect of multiple bottlenecks in the system increases with system topology complexity, and with the increase in VM performance and throughput.

With reference now to FIG. 1, a system level view of a hypothetical configuration 100 with a simple two cluster topology illustrates some constraint areas with respect to replication and CG scaling. In general, a VM 102 may issue IOs which are directed to a splitter 104. The splitter 104 directs the IOs received from the VM 102 to one or more RPAs 106 of a production side cluster 108. Note that while reference is made herein to DellEMC RecoverPoint Appliances, the scope of the invention is not limited to the use of such RPAs but extends, more broadly, to any replication appliance. Thus, references herein to an RPA are only by way of illustration, and are not intended to limit the scope of the invention in any way.

With continued attention to FIG. 1, the RPAs 106 of the cluster 108 receive the production IOs from the splitter 104 and send those production IOs to a cluster 110 at the replication side. Like the production side cluster 108, the replication side cluster 110 may include one or more RPAs 112. After the RPAs 112 receive the IOs from the production side cluster 108, the RPAs 112 may then write the IOs to storage 114. The storage 114 may be accessible by one or more VMs 116.

As shown in the example flow of FIG. 1, various constraints 'C' may be imposed on the production side and the replication side as an IO is received at the production side and replicated, ultimately, to storage 114. For example, an IO may experience latency as it is transmitted from the splitter 104 to the production side cluster 108. As another example, an RPA 106 may impose delay on the process flow by buffering IOs before those IOs are sent to the replication side cluster 110. Further, a delay may be experienced between the time an IO is transmitted from the production side cluster 108 until that IO is received at the replication side cluster 110, particularly where the two clusters are geographically remote from each other. A further example constraint that may affect a process flow such as that illustrated in FIG. 1 is buffering of incoming IOs at the replication side cluster 110. The buffering process may cause a delay to be imposed before the IOs can be written to storage 114. Finally, the process of actually writing of the IOs to storage 114 may be slow due to latency and/or other considerations.

As demonstrated by the example of FIG. 1, there may be a variety of replica side constraints that may adversely affect replication operations. Further constraints include, but are not limited to: IOPs and throughput of the incoming IO stream; storage throughput and latency; (SAN) networking throughput and latency; hypervisor CPU and networking resources; CPU and threading constraints on the replication appliance; other competing traffic; and, error handling. As well, the timing in which some of these constraints affect the system is different, and may be unknown. Thus, standard approaches do not provide good predictors for load balancing in the replica side CG.

Circumstances and conditions such as those just described, and in regard to FIG. 1, thus raise questions and concerns such as: what should be measured on the replica side to determine what the correct scale-out factor is; how can both the production side and replica side constraints be taken into consideration in making scaling decisions; and, how can those constraints be efficiently taken into consideration. A naïve approach would be to scale out the CG as much as possible, and leave it at that.

However there are disaster spec considerations and overhead associated with every additional scale-out node that is added, so scale out is significantly more complex than adding nodes, such as replication appliances, to a CG. As well, each node added to a CG is a potential failure point, the more nodes that are included on a single CG, the higher the probability that one or more nodes will fail at some point. In addition, there is added overhead in control path communication and memory. Lastly, journal access parallelism may also be a problem. Thus, there is a need to keep the CG at the minimal scale-out required to be efficient, while still meeting the VM performance constraints.

Figure 2:
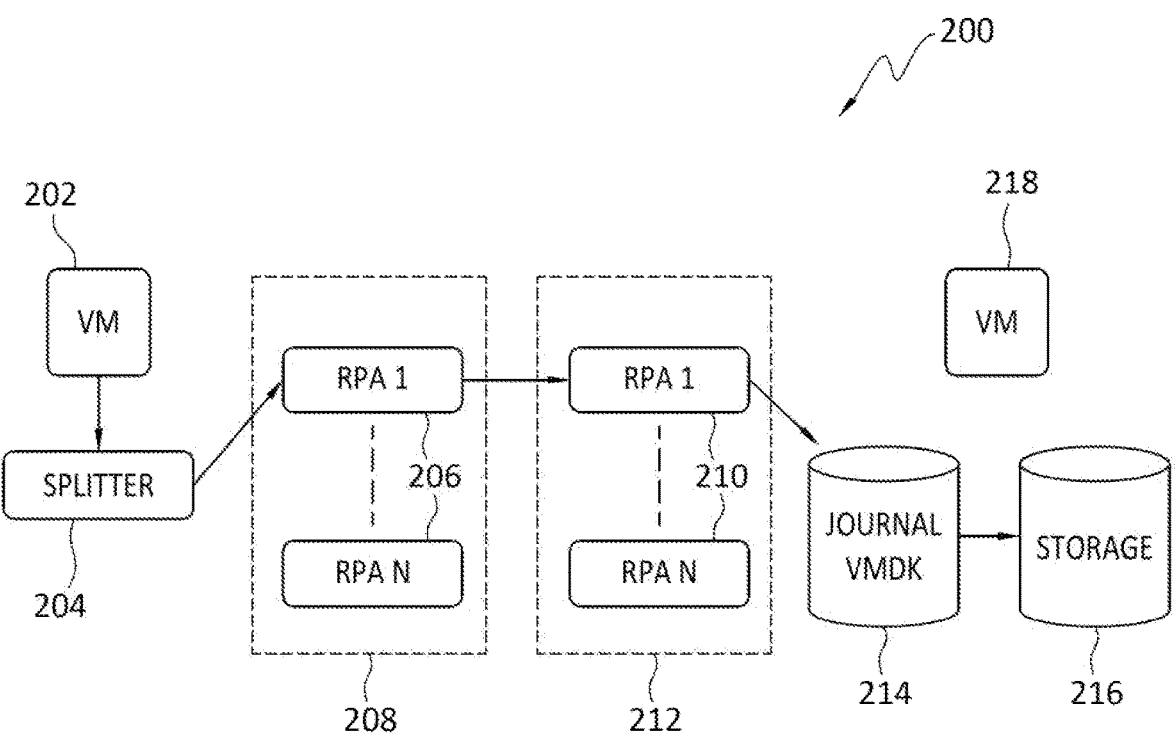
FIG. 2 discloses aspects of a replica journal VMDK.

As noted above, journal access parallelism, such as may result with addition of CG nodes, may introduce problems. With reference now to the hypothetical configuration 200 of FIG. 2, disclosing a replica journal VMDK, further details are provided concerning such journal related concerns. Similar to the example of FIG. 1, the configuration 200 may include one or more VMs 202 that transmit IOs to a splitter 204 which distributes the IOs to one or more RPAs 206 of a production side cluster 208. The IOs are then replicated to one or more RPAs 210 of a replication side cluster 212. The IOs may be tracked in a journal 214 in order to maintain write order fidelity. The journaled IOs may then be written to storage 216, where they may be accessible by one or more VMs 218.

In more detail, adding journals to support any PiT (point in time) restore gives rise to the additional complexity of managing the journal use and managing parallelism, that is, parallel access to the journals. A CG will have a journal associated with it, possibly stored on a virtual volume, such as VMDK on VMware. Data that lands in the journal 214, will later be distributed to the replica storage 216 to allow the VM 218 to access it. Difficulties arise when multiple replication appliances need to access the journal 214, or a group of journals.

In particular, in order to support scaling out a CG and distributing the load across multiple replication appliances, such as RPAs for example, all the appliances at the replica site need to access the journal 214. However, widely use virtual infrastructure platforms, such as VMware, HyperV, and Clouds, for example, are not well suited to support parallel access to virtual volumes such as may be used to host the journal 214 for example. VMware, in particular, requires specific restrictions on volume provisioning (Eager-zero Thick) and imposes constraints on multi-writer parallelism. Moreover, most public cloud providers do not allow multiple compute entities to connect to the same volume at all. For example, HyperV constrains the compute entity to be on the same hypervisor, thus creating a single point of failure.

As these considerations indicate, the use of multiple virtual volumes, such as may be used to store journal entries, is needed but would have to be implemented in a way that will ensure global across all volumes. Failing to do so will result in out of sequence IO distribution to the replica volume, which will defeat crash consistency. The problem of maintaining write-order fidelity is that if there is an attempt to synchronize write order across 'N' volumes, or journals, on a per IO basis, maintaining write order may be quite a slow process, and will inevitably get slower as more volumes are added and more IOs need to be journaled. This is contrary to the intended purpose of adding nodes to the CG, which is to maintain, or improve, the speed of IO replication. Implementation of locks or synchronizations at a per IO level is simply not practical and would only serve to bottleneck the IO replication process flow.

B. ASPECTS OF SOME EXAMPLE EMBODIMENTS

Some example embodiments of the invention may comprise two parts, the first of which is determining a scale-out level using a combination of various production measures, and also using a replica journal distribution lag parameter. The second part is multi-volume journal usage with splitter and management layer changes that may allow non-disruptive scale level changes while maintaining data consistency.

With reference first to the scale-out level, the term 'CG scale-out level' is used herein to refer to the number of RPAs, or other replication appliances, needed in the CG. The higher the number of replication appliances, up to some point, the higher the volume of IOs that can be handled. As noted elsewhere herein however, adding nodes to a CG comes at some cost, such as in the form of higher overhead. Thus, some embodiments of the invention may operate to determine the minimum number of nodes that still meets established performance criteria and/or criteria.

Figure 3:
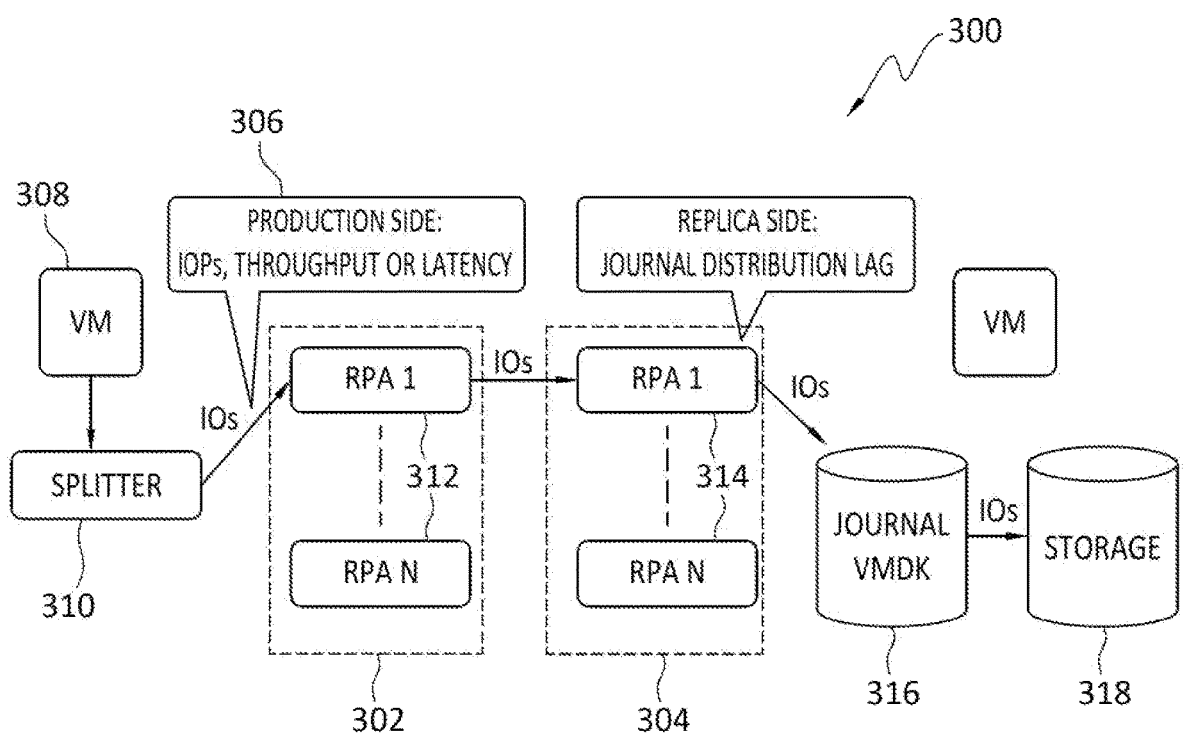
FIG. 3 discloses various measurements for determining a scale out level.

With reference to FIG. 3, a configuration 300 is included that may be similar, or identical, to the configuration 100 and/or the configuration 200. As such, only selected aspects of FIG. 3 are addressed in the following discussion. As shown in FIG. 3, the example configuration 300 includes a production side cluster 302 and a replication side, or replica side, cluster 304.

B.1 Production Side

On the production side, parameters 306 that may be considered in some embodiments include, but are not limited to, IOPs, throughput, and latency. In general, the amount of IOs coming in to the production side is not controllable. Rather, the volume of incoming IOs is determined by the entities, such as applications on VMs 308 for example, that generate the IOs during production, that is, normal, operations.

As applications and/or other entities generate more IOPs/throughput, and the load correspondingly increased on the replication appliance, the overall IO processing time on the replication appliance increases, resulting in delays. Unlike the IO volume however, the delays imposed at the replication appliance by the IO volume may be controlled in some circumstances.

With continue reference to the example of FIG. 3, latency is the time it takes an IO to be transmitted from the VM 308, or splitter 310, to a replication appliance such as the RPA 312, processed on the RPA 312, and an Ack returned from the RPA 312 to the splitter 310. Thus, increased latency limits the maximum IOPs that can be achieved by the application at the VM 308, thus delaying operations requested by the application. Some typical load balancing systems may allow use of latency as a primary measure to determine if scale-out is required or not.

In replication systems, the latency may be measured at the splitter 310 or VM 308 side. The latency value must be communicated to the replication appliance, such as the RPA 312, so that scale, that is, the number of RPAs, can be adjusted accordingly. As it may be difficult and/or problematic to communicate the latency value in this way, approximate measures of maximal IOPs, or throughput, may be used instead. For example, if an appliance can handle 'X' IOPs and 'Y' throughput, the incoming IOPs and throughput can be measured and then used to calculate the number of needed appliances as the maximum, thus: IOPs/IOPs per appliance, and throughput/throughput per appliance.

However, above some replication appliance utilization threshold, which may be expressed in terms of IOPs or throughput for example, and/or above some latency value, the scale-out level may have to be increased, that is, the number of RPAs may need to be increased. Below a replication appliance utilization threshold, scale down may be needed, that is, a decrease in the number of RPAs may be implemented. To avoid jitter, that is, jumps between different numbers of RPAs, a requirement may be imposed that a utilization threshold may have to be crossed for a specific amount of time before scale out, or scale down, is performed. For example, if utilization of a replication appliance crosses a utilization threshold of 90 percent, and the utilization of that replication appliance remains at 90 percent or higher for more than 60 seconds, then a scale out operation may be performed that adds one or more additional replication appliances to the CG.

B.2 Replication Side

A variety of factors may come into play on the replica side with regard to determination of the need to scale out or scale down, and there may in fact be too many factors to model simply and efficiently. After performing a series of tests, the inventors have determined that using the amount of Journal Distribution Lag (JDL) as a measurement may, in some embodiments at least, provide the best indicator to be used as a basis for making replication appliance scaling decisions.

As used herein, JDL refers to the amount of data that has reached the replication appliance(s), such as replication appliances 314 for example, but has not yet been able to be distributed to the journal 316. JDL may be readily tracked at the replication appliance(s) 314 that need to keep, in memory, any IOs that have not yet been distributed. This distribution can be delayed by many factors, such as CPU limits, and network and storage performance for example, but some embodiments of the invention are not concerned with the reason for the delay which, as noted, may not be controllable, but are instead concerned with the magnitude of the delay, that is, the amount by which distribution of data from the replication appliance to the journal is delayed. Note that the extent to which distribution of data is delayed is not necessarily a time measure, but may instead be a data measure that correlates to the memory usage for a particular CG on the replication appliance.

For example, if the amount of memory usage in a replication appliance exceeds a specified threshold, that may mean that distribution of data from the replication appliance to the journal distribution is too slow and scale-out is needed. If memory usage in the replication appliance is below some specified threshold, then scale down, that is, reduction of the number of replication appliances in the CG, can be implemented. Similar to the case of jitter avoidance on the production side, embodiments may specify that memory usage thresholds on the replication side must be crossed for at least a specific amount of time to avoid jittery behavior.

One advantage of using a memory usage threshold as a measure of delay in data distribution to the journal is that it combines, or accounts for, the effect of almost all replication side factors that relate to scale, including free CPU and threading, which are difficult to measure properly. Although if there is not enough CPU, distribution slows down. If there is a communication or storage failure, then the memory usage value may also increase. Once the failure is resolved, some time may have to be allowed for the system to catch-up, after which the evaluation goes back to normal. In some cases, it may be that enough lag has been accumulated to warrant scale-out for the catch-up process. That is, some load may be transferred to an additional replication appliance given more resources for catching up. After the system has caught up, that is, returned, to its normal operating state, scale down to the pre-catch up level of replication appliances may be performed if circumstances warrant, or the scale out that was performed to achieve catch-up may be maintained.

B.3 Combining Production Side and Replication Side

With the foregoing production side and replication side discussion in view, suppose that a current scale-out for a cluster of replication appliances is at level 'X.' If any of the production side measures or replication side measures exceeds a respective specified upper threshold, then the scale-out level is increased to 'X+1.' On the other hand, if all of the production side measures and replication side measures are under respective specified lower thresholds, then the scale-out level is decreased to 'X−1.' In some embodiments, the scale-out decrease may be performed only if/when all of the production side measures and replication side measures are under respective specified lower thresholds. In any event, after a change in scale-out level is applied, the system may be given some time to adjust to the new state, before additional changes in scale-out level can be determined and implemented.

In some cases, if a threshold is exceeded by a significant margin, such as greater than about 15 percent for example, the level of scale out may skip one or more intermediate levels of scale out. For example, in such a scenario, the system may be scaled out from 'X' directly to 'X+2,' thus skipping the 'X+1' scale out level. This approach may, among other things, avoid jitter that would otherwise be experienced by the system in implementing multiple scale outs, from 'X' to 'X+1,' and then again from 'X+1' to 'X+2.' As well, this approach of implementing a single scale out may be implemented more quickly than if two or more scale outs were implemented one after the other until the final scale out was achieved.

B.4 Multi-Volume Journal Management

In a multi-volume schema according to some embodiments, the number of journal volumes used may be tied to the scale-out level of the CG. For example, for a scale-out level of 'X,' 'X' journal volumes may be employed.

Figure 4:
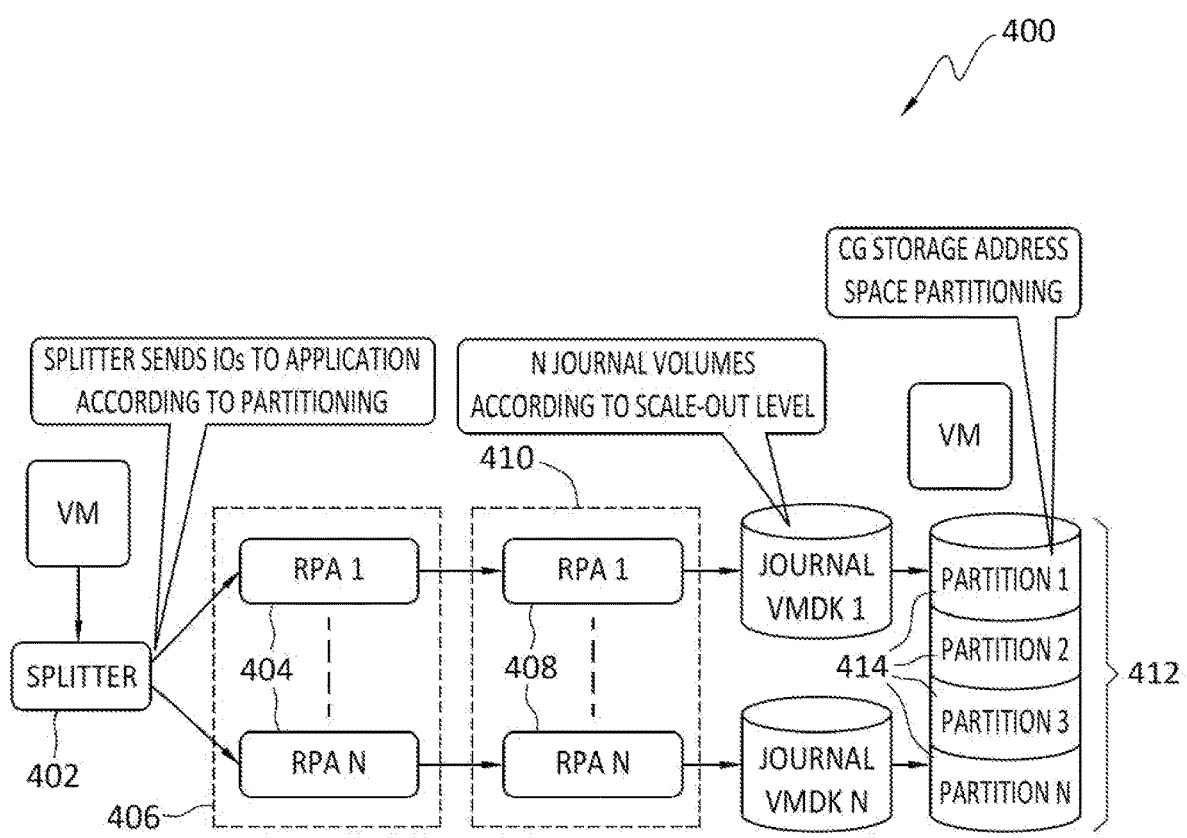
FIG. 4 discloses an example scaled out CG with address space partitioning.

With reference now to the example configuration 400 disclosed in FIG. 4, which shows a scaled out CG with address space partitioning, a splitter 402 may number the IOs so that global write order fidelity can be determined. However, there may still be a need to handle synchronization between multiple journal volumes and to support changing the number of volumes dynamically. Next, the concepts of CG address space partitioning and transition barriers will be defined. The splitter 402 may be configured to send IOs to replication appliances, such as the RPAs 404 of the production side cluster 406, according to the defined partitioning, and the splitter 402 may also be configured to create barriers whenever the scale-out level and, thus, volume topology, changes. A replication appliance 408, of the replication side cluster 410, may be configured to provide distribution synchronization when barriers are encountered, and may also be configured to provide management of journal volumes lifecycles.

With continued reference to the example of FIG. 4, details are provided concerning CG address space partitioning. In general, a consistency group may preserve write order fidelity across multiple production volumes such as, for example, all VMDKs of a single VM. Example embodiments of the invention may treat these production volumes as one continuous address space by conceptualizing them as appended one after the other in a specific order, as if the different production volumes form one meta-volume. To simplify the discussion, it may be assumed that the CG in this illustrative example has just one volume, or replication appliance. The abstraction of multiple production volumes as being associated with a single continuous address space thus corresponds to the CG having a single address space, so that one value is adequate to designate where, in the address space, data is supposed to be written or read.

For the purposes of some embodiments of the invention, the partitioning of the CG address space into multiple partitions may be defined by two rules or considerations, the first of which is that the partitions, however many there may be, collectively cover or embrace the entire address space. The second rule or consideration is that no two partitions overlap each other. Given these rules then, and the abstraction noted above, every address in the address space belongs to or designates one, and only one, partition.

Partitioning of the CG address space may be implemented in a variety of ways. Following are some non-limiting examples of partition schemes. In one example the address space may be partitioned into 'N' equal parts, where each of the parts have the same number of addresses. In another example, the address space may be partitioned into 'N' MB segments with a respective segment address 'modulo N.' As a final example, the address space may be partitioned into a table of addresses belonging to 'N' areas. Note that partitions of the address space need not equally distributed among replication appliances. For example, a number of partitions may be collectively designated to two or more replication appliances, and assignment of the individual partitions to the replication appliances may be performed in proportion to replication appliance resource capabilities or free resources. For example, from a group of 3 partitions, 2 of the partitions may be assigned to one replication appliance, and the other 1 partition assigned to a second replication appliance.

In general, the particular partitioning scheme, and resulting partitions, may not always matter, so long as the splitter and replication appliances are operating on an agreed upon scheme, the partition scheme is valid. For the sake of simplicity, and with reference to the example of FIG. 4, it may be assumed in some embodiments that the partitioning of the address space 412 is N equal parts 414 of continuous space. Note that in some embodiments however such as partitioning scheme may not be recommended as in some circumstances, IO patterns may create an unbalanced appliance load, such that the partitions of a single address space may not all be the same size.

B.5 Journal Transition Barriers

Example embodiments of the invention may employ journal transition barriers. As used herein, a 'journal transition barrier' or 'journal transition barrier point'(or simply, 'transition point' or 'barrier') refers to an incremental number that is increased by one (1) every time the journal volume layout is changed. A message may be placed in the journal volumes at the transition point in time, and the message may include the barrier number, as a given journal volume may include multiple journal transition barriers.

A cluster management software may determine the scale-out level, as disclosed elsewhere herein, and the scale-out level may be tied to the number of journal volumes. Therefore, every change in the level of scale-out, whether the change is a scale out or scale down, increments the barrier counter and causes a barrier message to be placed in the affected journal volumes at the time 'T' of transition, that is, the time 'T' when the change in scale out level occurred. As explained hereafter, embodiments of the invention may provide for synchronized distribution of data with N journal volumes.

An advantageous aspect of some embodiments of the disclosed partitioning scheme is that the scheme creates disjoint areas of storage, to which each of the N appliances in the CG can distribute data freely, without concern of being run over by other appliances or losing write order fidelity. In fact, write order may only need to be maintained within the confines of each partition. If the system wants to move the target volume to point in time #T, then each partition of the address space may independently transition to the last IO that the partition has before #T. This transitioning is possible because, as noted, each of the partitions may include a barrier that was inserted at time #T when a scaling operation took place. In normal operation, there may be no need to synchronize the partitions with each other, and therefore each replication appliance can work independently of the other replication appliances.

In some embodiments, synchronization of the partitions may be required only when a user specifies a specific point in time for replicated data that the user wants to access, such as in the case of an image access process, or a DR (Disaster Recovery) test. Synchronization of the partitions may also be required at journal transition barriers, as discussed in further detail below.

Figure 5:
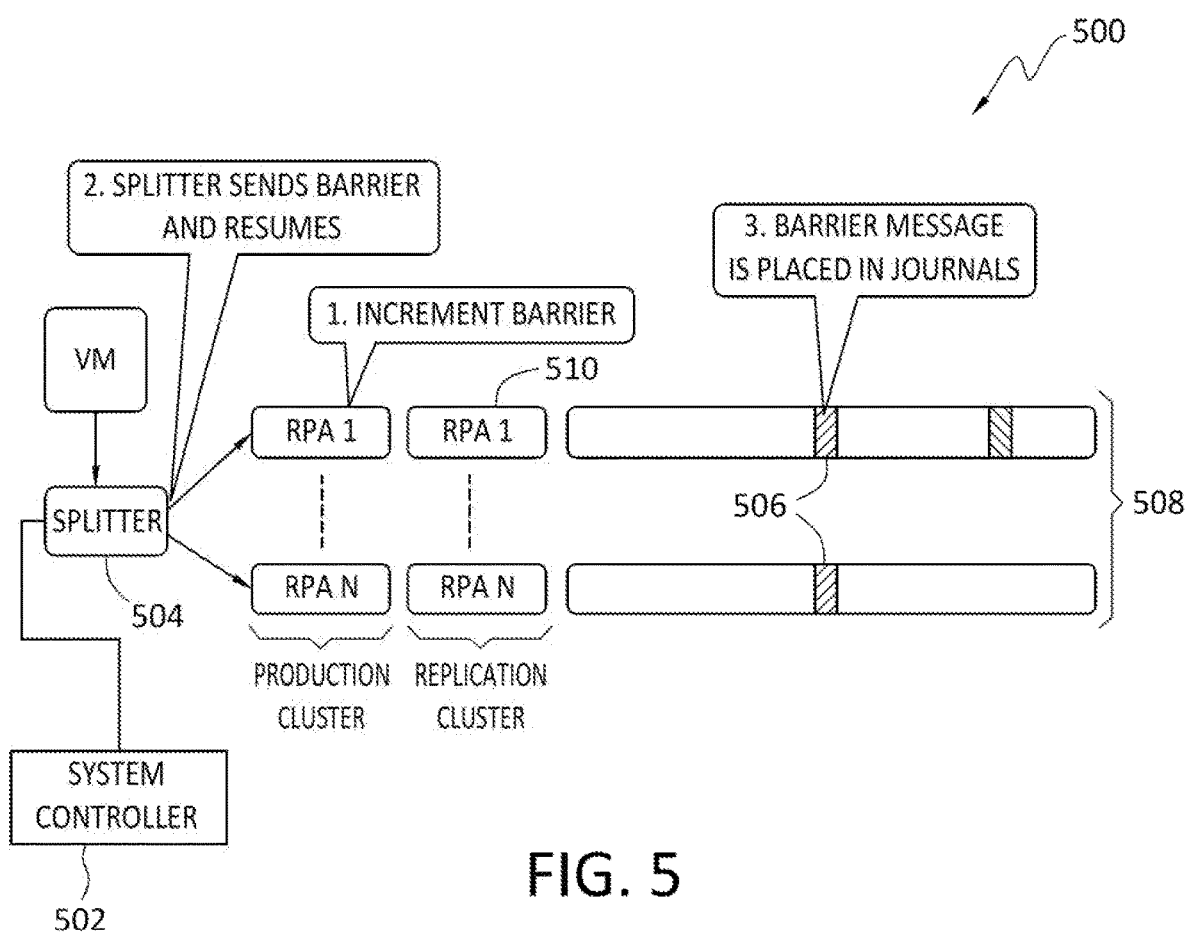
FIG. 5 discloses the handling of transitions and associated barriers.

Turning now to the example configuration 500 of FIG. 5 which discloses aspects of handling scaling transitions and journal barriers, and with respect to the handling of transitions, or changes, in a scale out configuration, various processes may be implemented. For example, and as shown in FIG. 5, when a change in scale-out level is requested, such as by a system controller 502, which may take the form of an appliance management platform or cluster management platform for example, the system controller 502 may increment the barrier number. The system controller 502 may then notify the splitter 504 of the barrier number and the new scale out level, along with the matching partition, which may be predefined. Next, the splitter 504 may flush any IOs that it has, to ensure processing of any pending IOs prior to implementation of the transition, and then sends a message containing the new journal barrier point 506 to all the appliances in the CG, or that were in the CG beforehand. The barrier point 506 is then marked or otherwise noted in all the journals 508. Once the journals 508 have been updated with the new barrier point 506, the splitter 504 may resume sending IOs in accordance with the new partitioning.

Note that absent the use of barrier points as disclosed herein, each change to the address space partition scheme that results from a transition in scaling may cause, or at least permit, appliances to write to different areas in the journals, and overrun each other with writes. As noted earlier herein, each journal where data is stored may correspond to a portion, or partition, of an address space. Thus, data may be written to a journal at the addresses specified in the partition of the address space that corresponds to that journal.

As discussed in more detail below, when a transition occurs and one or more RPAs are added to, or removed from, a CG, which may also be referred to as a replication cluster or comprising a replication cluster, the address space may need to be repartitioned to accommodate the new number of RPAs. In the event that the address space has not been fully allocated to all the RPAs, such that there may be unallocated address space, the unallocated address space may be assigned to any new journal(s) necessitated by the transition. If new journals are needed as a result of the transition, unused journal volumes may be reclaimed for any new journals.

Each transition between different scale out configurations may change the partitioning of the address space. Thus, each transition may require the definition and use of a synchronization point, that is, the barrier point. Particularly, each of the replication appliances 510 in the CG may be required to stop distribution of data to its respective journal 508 at the barrier point 506 until the rest of the replication appliances arrive at the barrier point 506 in their respective journals 508. When a replication appliance 510 reaches the barrier point 506 in its journal 508, the replication appliance 510 notifies the system controller 502. Once all appliances reach the barrier point in their respective journals, the system controller 502 may instruct all the appliances writing to the journal(s) corresponding to the new partition(s) to begin distribution in the case of new replication appliances, or to resume distribution in the case of existing replication appliances, of data to the new journals and existing journals, respectively.

As suggested above, a journal volume may have an associated lifecycle. For example, when the scale of a CG increases, new journal volumes need to be provisioned, or idle journal volumes reclaimed. On the other hand, when the scale has decreased, now-unused journals may be idled, or removed.

With respect to the removal of unused journal volumes, when the scale of a replication cluster decreases, one or more journals may no longer be needed for distribution of data. However, those journals still may contain undistributed IOs and hold PiT history. Such journals may be idled, that is, they may be managed, by a system controller 502 for example, but there is no IO activity unless history is accessed. As other journals fill up with new data, the history of those journals may be trimmed accordingly since those histories may be redundant of the history held in the idled journal. Once one of the journal volumes trims timestamps contained in an idle journal volume history, the idle journal volume data may also be trimmed as a cross-volume consistent point in time at that PiT cannot be created. Once all the history is trimmed from an idled journal volume, that journal may be deleted.

With regard to reclamation of idle journals, there may be situation where the scale is reduced, thus creating idle journal volumes, and later increased again. Instead of provisioning an additional journal volume, which may be possible, another approach is to reclaim existing idle journal volumes. Reclamation of idle journals may be performed by noting that barrier point explicitly define changes in topology and therefore also defines the journal gaps, that is, the area between the barrier that moved the journal to idle and the one that reclaimed it. In gaps, there is no distribution or any other activity from that journal. History may still be accessed in the areas that the journal volume covers. It should also be noted that journal barrier notifications may account for the gaps, as the topology is known at each transition, so the gap barrier events are not expected from that journal volume. Instead, that journal volume may wait until distribution from the relevant gap is needed.

C. FURTHER DISCUSSION

Following is further discussion concerning aspects of some example embodiments. Among other things, some example embodiments of the invention provide a way to automatically scale-out a CG. As another example, embodiments embrace methods for determining the needed scale, and for managing journal volume access and lifecycle in order to be able to implement a scaled-out CG. Yet other aspects of some example embodiments include the use of journal lag as measure for scale-out level at a replication side, combining production and replication measures for automatic scale-out determination, the use of address partitioning and journal barrier points for synchronization of journals, and journal volume lifecycle management.

D. EXAMPLE METHODS

Figure 6:
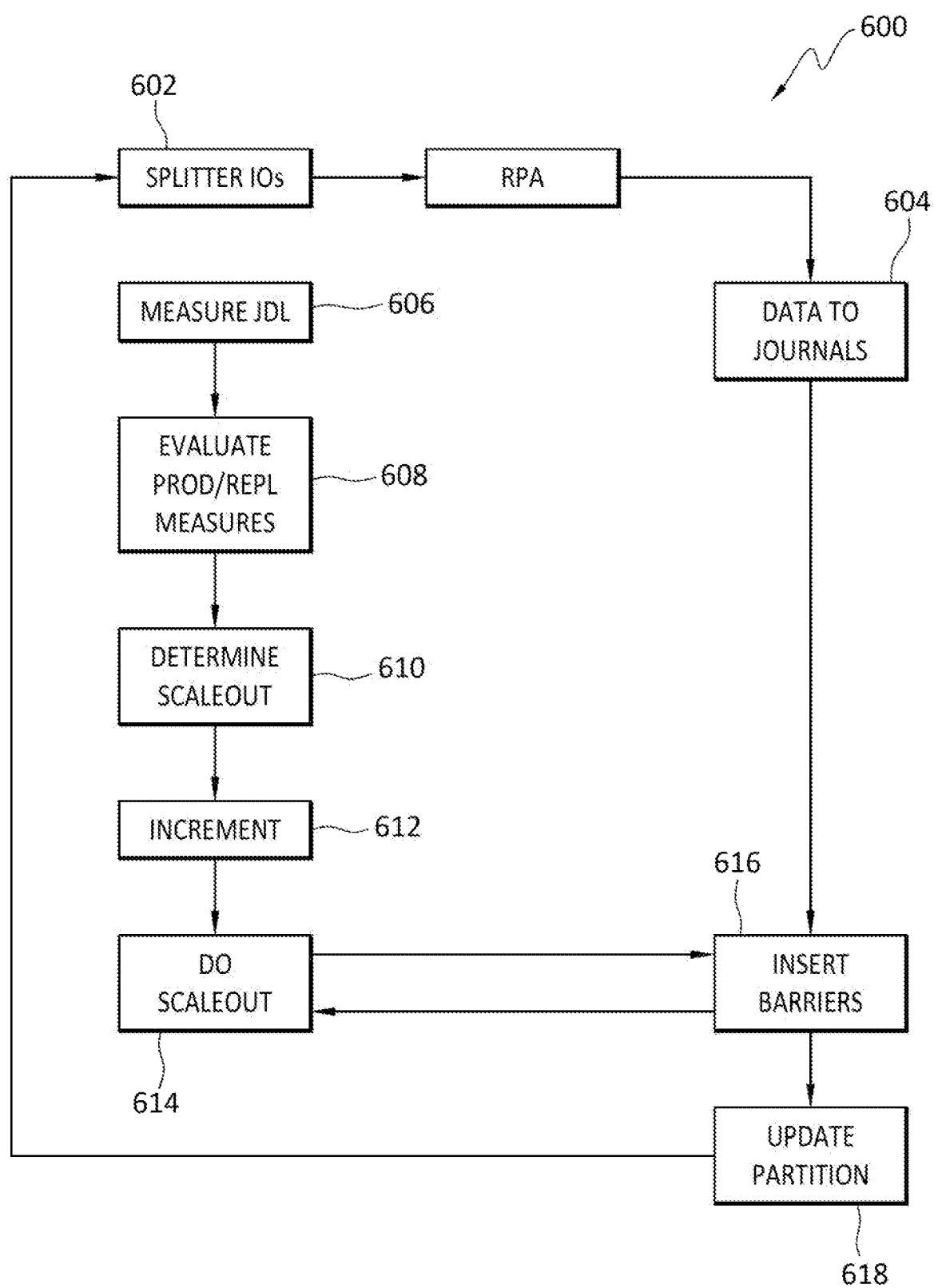
FIG. 6 discloses an example method for CG scale out.

It is noted with respect to the example method of FIG. 6 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 6, example methods for automatic consistency group scale-out for any PiT replication systems are disclosed, where one example method is denoted generally at 600. Embodiments of the invention may be cooperatively performed by a production side replication cluster and a replication side replication cluster. Other embodiments may be performed solely by a production side replication cluster, or solely by a replication side replication cluster. More generally, no particular embodiment is required to be performed by any particular entity, or group of entities, and the foregoing are thus presented only by way of example.

It should be noted that while the method 600 may at times refer to a splitter, replication appliance, or journal, in the singular, embodiments of the invention embrace configurations and arrangements that may involve multiple splitters, replication appliances, and journals. Thus, the example method 600 should not be interpreted as limiting the scope of the invention in any way.

The method 600 may be performed in connection with a splitter that is directing IOs 602 to a replication appliance on an ongoing basis as IOs are received from VMs and/or other entities. The replication appliance may write 604 the corresponding data to a particular set of addresses in one or more journals.

While the transmission of IOs is ongoing, and the data corresponding to the IOs is being written to the journals, an evaluation process may likewise be ongoing, or started, that may evaluate, on a continuous, periodic, or ad hoc, basis, whether or not there is a need to scale out the cluster, that is, the CG, that includes the replication appliance, so as to ensure that the CG resources are well matched with the IO volume incoming at the production side. The evaluation process may begin with measuring 606 a journal distribution lag (JDL) to determine the amount of data that has reached the replication appliance but has not yet been distributed by the replication appliance to the journal.

In addition to measuring the JDL 606, an evaluation 608 may be performed of one or more other production side measures and replication side measures, such as, but not limited to, latency, IOPs, and throughput. These measures, along with the JDL, may then be used to determine 610 whether or not scaling is required and, if so, whether the scaling operation will be a scale out operation that adds one or more nodes, that is, replication appliances, to the replication side cluster, or a scale down or downscale operation that idles or removes one or more replication appliances from a cluster. The scaling operation, if one is determined to be needed, that is performed on the replication side may be mirrored on the production side as well. That is, the same scaling operation may be performed on the production side as on the replication side.

If a determination is made 610 that a scaling operation is needed, a counter may be incremented 612 by 1. In some embodiments, the incrementing process may be performed after, rather than before, the scale out operation has been implemented 614. In any case, a journal barrier transition may be defined as the incremental number. In either case, the barrier point may be communicated to the journal and inserted 616 in the journal volume at the transition point in time, that is, the time when the scaling operation is implemented 614, such that the cluster of replication appliances transitions from one configuration to another configuration as a result of the scaling process.

Because each replication appliance is associated with a respective journal that, in turn, is associated with a respective partition of an address space, the partitions of the address space may need to be modified after one or more replication appliances are added to, or removed from, the replication cluster as a result of the scaling operation. Thus, the method 600 may continue with implementation of an update 618 to the partitions of the address space. Once the partitions have been updated, and the system stabilized, the splitter may resume sending IOs 602 to the replication appliances.

E. FURTHER EXAMPLE EMBODIMENTS

Following are some further example embodiments of the invention. These are presented only by way of example and are not intended to limit the scope of the invention in any way.

Embodiment 1. A method, comprising: measuring a journal distribution lag of a journal; evaluating a first operational measure at a production site, and evaluating a second operational measure at a replication site operable to communicate with a production site; based on the journal distribution lag, and the evaluation of the first operational measure and the second operational measure, determining a scale out for a consistency group of the replication site; and implementing the scale out of the consistency group.

Embodiment 2. The method as recited in embodiment 1, wherein when any of the operational measures exceeds a defined upper threshold, implementing the scale out comprises increasing a number of replication appliances of the consistency group, and when all of the operational measures are below a defined lower threshold, implementing the scale out comprises reducing the number of replication appliances of the consistency group.

Embodiment 3. The method as recited in any of embodiments 1-2, wherein the journal distribution lag is a measure of an amount of memory used by a replication appliance of the consistency group.

Embodiment 4. The method as recited in any of embodiments 1-3, wherein the first operational measure and/or the second operational measure each comprise one or more of: latency; IOPs; and, throughput.

Embodiment 5. The method as recited in any of embodiments 1-4, wherein when the journal distribution lag exceeds a threshold for a defined period of time, scale out is determined to be needed, and when the journal distribution lag is at or below the threshold, scaled out is determined not to be needed.

Embodiment 6. The method as recited in any of embodiments 1-5, wherein scale out of the consistency groups comprises either increasing, or decreasing, a number of replication appliances in the consistency group.

Embodiment 7. The method as recited in any of embodiments 1-6, wherein the journal is operable to write data to a corresponding partition of an address space that contains all addresses to which replication appliances of the consistency group write.

Embodiment 8. The method as recited in any of embodiments 1-7, wherein when scale out is implemented, one or more partitions of an address space that corresponds to the consistency group are modified.

Embodiment 9. The method as recited in any of embodiments 1-8, wherein when scale out is implemented at a time 'T,' a barrier point is defined and inserted in the journal at the time 'T,' and a replication appliance of the consistency group is required to stop writing to the journal when the barrier point is reached.

Embodiment 10. The method as recited in embodiment 9, wherein after all replication appliances in the consistency group have reached the barrier point in their respective journals, and partitions of an address space corresponding to the consistency group have been updated, the replication appliances are permitted to begin, or resume, writing to their respective journals.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-12.

F. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
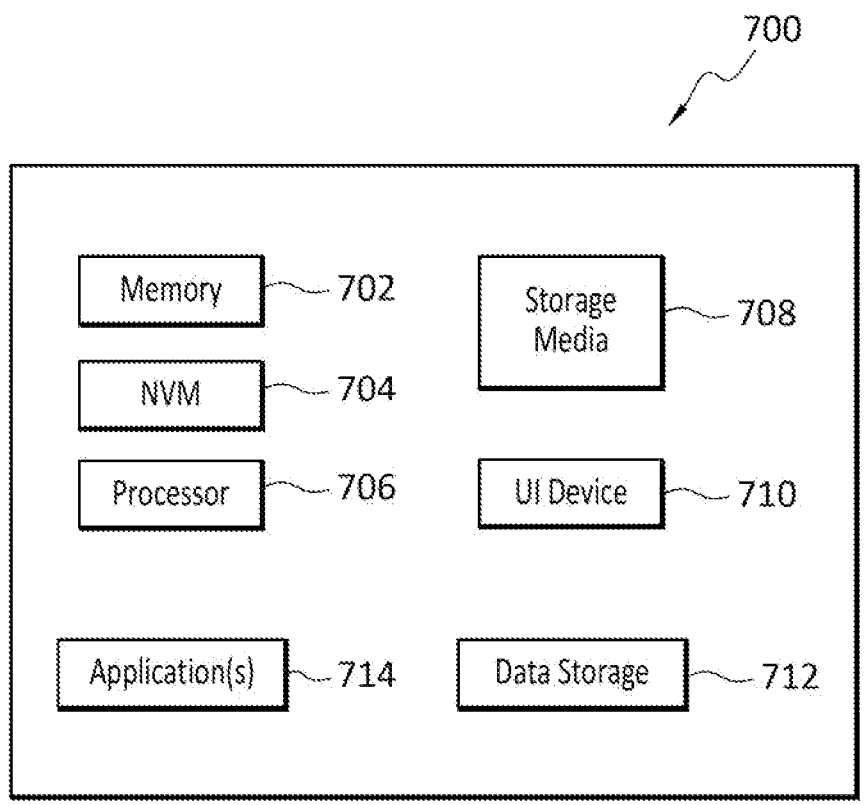
FIG. 7 discloses an example computing entity operable to perform any of the disclosed methods and processes.

With reference briefly now to FIG. 7, any one or more of the entities disclosed, or implied, by FIGS. 1-6 and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization w of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising: measuring a journal distribution lag of a journal, wherein the journal distribution lag is a measure to determine an amount of data that has reached a replication appliance but has not yet been distributed by the replication appliance to the journal;
    evaluating a first operational measure at a production appliance, and evaluating a second operational measure at the replication appliance, which is operable to communicate with the production appliance;
    determining a scale out for a consistency group of the replication appliance is needed based on the journal distribution lag exceeding a threshold, the first operational measure, and the second operational measure, wherein the threshold defines an amount of memory available to the replication appliance of the consistency group;
    implementing the scale out of the consistency group;
    wherein when the scale out is implemented at a time 'T,' a barrier point is defined and inserted in the journal at the time 'T,' and the replication appliance of the consistency group is required to stop writing to the journal when the barrier point is reached;
    and wherein after all replication appliances in the consistency group have reached the barrier point in their respective journals, and partitions of an address space corresponding to the consistency group have been updated, the replication appliances are permitted to begin, or resume, writing to their respective journals.

2. The method as recited in claim 1, wherein when any of the operational measures exceeds a defined upper threshold, implementing the scale out comprises increasing a number of replication appliances of the consistency group, and when all of the operational measures are below a defined lower threshold, implementing the scale out comprises reducing the number of replication appliances of the consistency group.

3. The method as recited in claim 1, wherein the first operational measure and/or the second operational measure each comprise one or more of: latency; IOPs; and, throughput.

4. The method as recited in claim 1, wherein when the journal distribution lag exceeds the threshold for a defined period of time, scale out is determined to be needed, and when the journal distribution lag is at or below the threshold, scaled out is determined not to be needed.

5. The method as recited in claim 1, wherein scale out of the consistency groups comprises either increasing, or decreasing, a number of replication appliances in the consistency group.

6. The method as recited in claim 1, wherein the journal is operable to write data to a corresponding partition of an address space that contains all addresses to which replication appliances of the consistency group write.

7. The method as recited in claim 1, wherein when scale out is implemented, one or more partitions of an address space that corresponds to the consistency group are modified.

8. A computer readable storage medium having stored therein instructions that are executable by one or more hardware processors to perform operations comprising:
    measuring a journal distribution lag of a journal, wherein the journal distribution lag is a measure to determine an amount of data that has reached a replication appliance but has not yet been distributed by the replication appliance to the journal;
    evaluating a first operational measure at a production appliance, and evaluating a second operational measure at the replication appliance, which is operable to communicate with the production appliance;

determining a scale out for a consistency group of the replication appliance is needed based on the first operational measure, the second operational measure, and the journal distribution lag exceeding a threshold, wherein the threshold defines an amount of memory available to the replication appliance of the consistency group; and implementing the scale out of the consistency group;

wherein when the scale out is implemented at a time 'T,' a barrier point is defined and inserted in the journal at the time 'T,' and the replication appliance of the consistency group is required to stop writing to the journal when the barrier point is reached;

and wherein after all replication appliances in the consistency group have reached the barrier point in their respective journals, and partitions of an address space corresponding to the consistency group have been updated, the replication appliances are permitted to begin, or resume, writing to their respective journals.

9. The computer readable storage medium as recited in claim 8, wherein when any of the operational measures exceeds a defined upper threshold, implementing the scale out comprises increasing a number of replication appliances of the consistency group, and when all of the operational measures are below a defined lower threshold, implementing the scale out comprises reducing the number of replication appliances of the consistency group.

10. The computer readable storage medium as recited in claim 8, wherein the first operational measure and/or the second operational measure each comprise one or more of: latency; IOPs; and, throughput.

11. The computer readable storage medium as recited in claim 8, wherein when the journal distribution lag exceeds the threshold for a defined period of time, scale out is determined to be needed, and when the journal distribution lag is at or below the threshold, scaled out is determined not to be needed.

12. The computer readable storage medium as recited in claim 8, wherein scale out of the consistency groups comprises either increasing, or decreasing, a number of replication appliances in the consistency group.

13. The computer readable storage medium as recited in claim 8, wherein the journal is operable to write data to a corresponding partition of an address space that contains all addresses to which replication appliances of the consistency group write.

14. The computer readable storage medium as recited in claim 8, wherein when scale out is implemented, one or more partitions of an address space that corresponds to the consistency group are modified.

* * * * *